Dec. 2, 1958 M. W. GUYER 2,862,433

ROD TILLING IMPLEMENT

Filed Sept. 22, 1955 8 Sheets-Sheet 1

INVENTOR.
Morris W. Guyer
BY Gruhlwells
Atty.

Dec. 2, 1958 M. W. GUYER 2,862,433

ROD TILLING IMPLEMENT

Filed Sept. 22, 1955 8 Sheets-Sheet 2

INVENTOR.
Morris W. Guyer
BY
[signature]
Atty.

Dec. 2, 1958 M. W. GUYER 2,862,433

ROD TILLING IMPLEMENT

Filed Sept. 22, 1955 8 Sheets-Sheet 3

INVENTOR.
Morris W. Guyer
BY Greist Wells
Atty.

Dec. 2, 1958 M. W. GUYER 2,862,433

ROD TILLING IMPLEMENT

Filed Sept. 22, 1955 8 Sheets-Sheet 4

INVENTOR.
Morris W. Guyer
BY Gredwells
Atty.

Dec. 2, 1958 M. W. GUYER 2,862,433

ROD TILLING IMPLEMENT

Filed Sept. 22, 1955 8 Sheets-Sheet 5

INVENTOR.
Morris W. Guyer
BY [signature]
Atty.

Dec. 2, 1958

M. W. GUYER 2,862,433

ROD TILLING IMPLEMENT

Filed Sept. 22, 1955

8 Sheets-Sheet 6

INVENTOR.
Morris W. Guyer
BY [signature]
Atty.

Dec. 2, 1958

M. W. GUYER 2,862,433

ROD TILLING IMPLEMENT

Filed Sept. 22, 1955

8 Sheets-Sheet 7

INVENTOR.
Morris W. Guyer

BY

Atty.

Dec. 2, 1958 M. W. GUYER 2,862,433

ROD TILLING IMPLEMENT

Filed Sept. 22, 1955 8 Sheets-Sheet 8

INVENTOR.
Morris W. Guyer
BY [signature]
Atty.

2,862,433
Patented Dec. 2, 1958

2,862,433

ROD TILLING IMPLEMENT

Morris W. Guyer, Spokane, Wash., assignor to Calkins Manufacturing Company, Spokane, Wash.

Application September 22, 1955, Serial No. 535,786

15 Claims. (Cl. 97—42)

The present invention relates to improvements in a tillage implement.

In soil cultivation, it is common practice to use implements of the general type disclosed in Patent No. 2,355,-950 to Claude C. Calkins, dated August 15, 1944, wherein a square rotating rod drawn transversely through the soil is used to uproot weeds and the like. As shown in this patent, a series of closely spaced shovels or tillage points are mounted so as to precede the rod through the soil. These shovels break and cultivate the ground in advance of the rod, and are particularly useful in maintaining uniform depth of penetration of the rod through spots of hard ground encountered in the field.

While implements of this type are extremely useful, they do have certain drawbacks. For example, the tillage shovels must be angularly adjustable with respect to the ground so that they may be adjusted to operate properly under various soil conditions. To be practical, the angular adjustment means must be such that adjustment can be quickly made in the field. Yet this means must be so designed that the mountings for the shovels and rod do not cause undue soil disturbance or leave furrows in the soil.

Another problem arises when the implement has finished its work and is to be raised for transportation. Since the rod and shovels all travel beneath the ground surface, considerable power is required to raise the machine clear.

It is the principal purpose of this invention to provide a tillage implement of the type described wherein a series of tillage shovels are mounted so as to precede the rotary rod through the soil, the shovels being mounted for quick and easy angular adjustment about the rod.

A further purpose is to provide such a device wherein the shovel mounting and adjusting means are designed to cause a minimum of soil disturbance and furrowing.

Still another purpose of the invention is to provide a lifting mechanism for the implement which may be used as a single lever to lift and lower the rod and shovel supporting frame, and which may be used under adverse conditions as a step by step ratchet lever at a greatly increased mechanical advantage.

A still further purpose of the invention is to provide a center drive mechanism for the implement which is more efficient and uses fewer parts than common drive mechanisms.

The nature and advantages of my invention will appear more clearly from the following description and the accompanying drawings wherein a preferred form of the invention is shown. It should be understood, however, that the description and drawings are illustrative only, and are not intended to limit the invention except insofar as it is limited by the claims.

Figure 1:
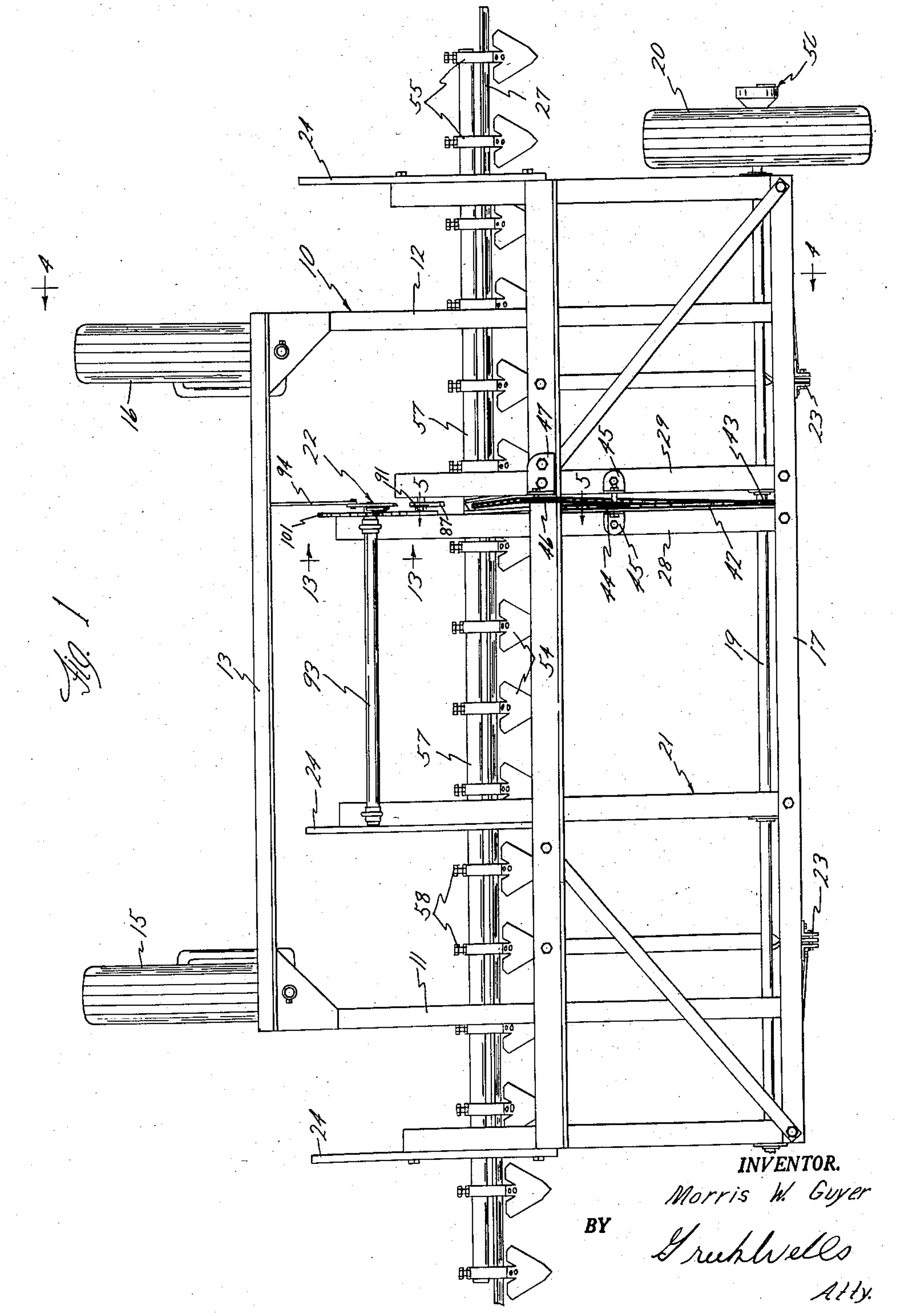
Figure 1 is a plan view of a tillage implement embodying my invention.

Referring now to the drawings, and to Figures 1, 2, 3 and 4 in particular, my invention is shown as embodied in a tillage implement constructed similar to the commonly known rod weeder. The implement has a main frame 10 comprised of two spaced apart longitudinal beams 11 and 12, connected at their rear ends by a cross member 13. A pair of caster wheels 15 and 16 support the rear of the frame 10. The front ends of the beams 11 and 12 are pivotally connected to a transverse beam 17. The beam 17 has thereon depending bearing brackets 18 which rotatably mount an axle 19. Front supporting wheels 20 are mounted at each end of the axle 19. The front transverse beam 17 also forms part of a vertically pivotable gooseneck supporting frame 21. The frame 21 is connected at the rear to the frame 10 by a lifting mechanism 22, described later herein, which permits vertical angular adjustment of the frame 21 to control the depth of soil cultivation by the machine. The implement is drawn through the fields by a powered vehicle (not shown) which is connected by suitable means to hitching brackets 23 secured to the beam 17.

The frame 21 has fixed thereon a plurality of depending rod supporting gooseneck standards 24 which curve downwardly and forwardly under the implement. Each of the standards 24 carries at its lower end a shoe 25, described in detail later herein. The shoes rotatably support bearing spools 26, which in turn support a square transverse rod 27. The rod 27 is adapted to rotate in the shoes 25 as the machine is drawn through the field.

The rod 27 is driven by means of a center drive mechanism which will now be described. On the frame 21, and spaced between two of the goosenecks 24, a pair of longitudinally extending angle irons 28 and 29 are fixed. A center drive boot 30 extends rearwardly and downwardly between these members 28 and 29. The boot 30 is a metal plate bent into a U shape so that it has two spaced apart side walls 30*a* and 30*b* connected by a front wall 30*c*. The boot 30 is strengthened by a second U-shaped plate 31 which is inserted between the walls 30*a* and 30*b* and welded into place. The U-shaped plate 31 is positioned so that its side walls 31*a* and 31*b* lie adjacent the walls 30*a* and 30*b* and its connecting wall 31*c* faces to the rear. The plate 31 extends a short distance below the lower end of the boot 30, and has a spacing block 32 fixed between its walls 31*a* and 31*b*. A pair of spaced apart shoe plates 33 and 34 are positioned at the lower end of the boot 30 at each side of the extended portion of the plate 31. The shoe plate 34 is welded to the wall 30*a* of the boot 30 and thus permanently fixed thereto. The shoe plate 33 is secured in place by means of two countersunk screws 35 which are threaded into the spacer block 32. The shoe plates 33 and 34 are secured together at their forward ends by a nose piece 36.

Figure 8:
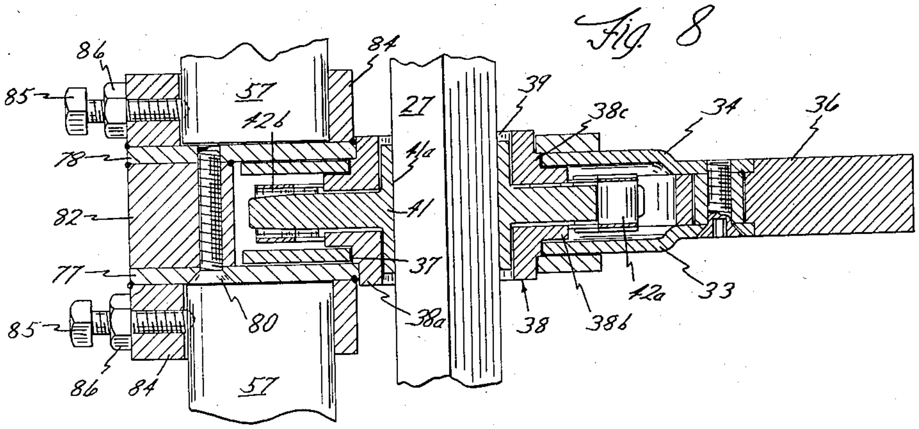
Figure 8 is an enlarged sectional view taken on the line 8—8 of Figure 6.
Figure 9:
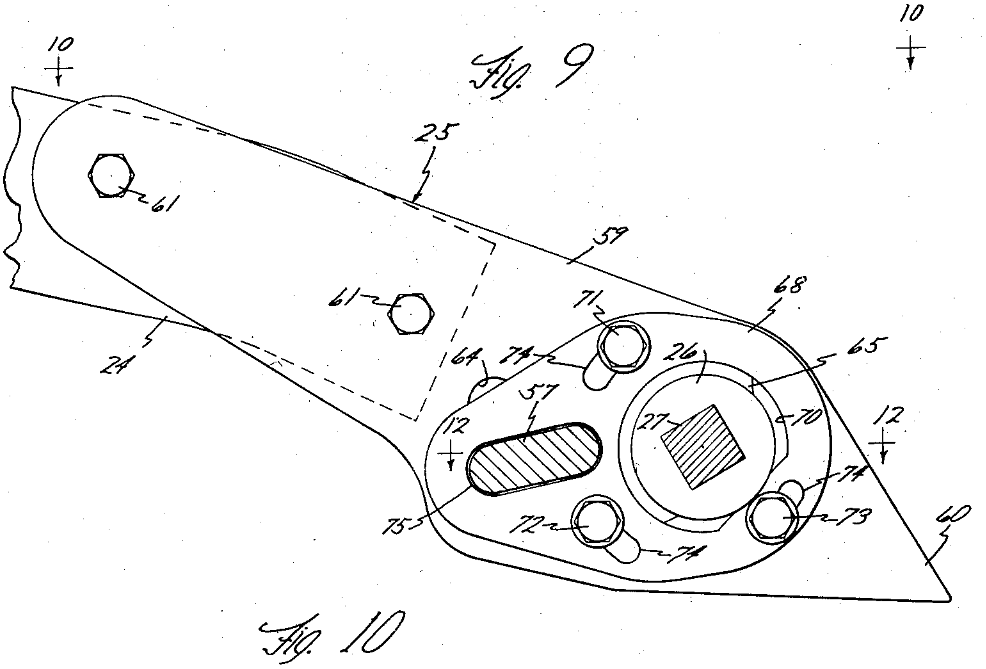
Figure 9 is an enlarged fragmentary sectional view taken on the line 9—9 of Figure 2.
Figure 10:
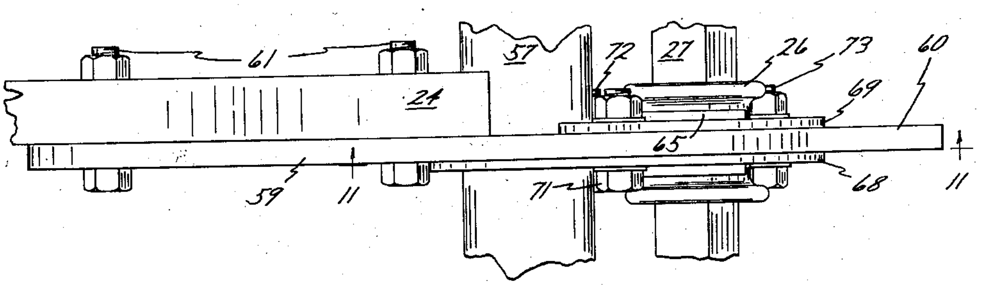
Figure 10 is a fragmentary plan view of the parts shown in Figure 9 looking in the direction of the arrows 10—10 of Figure 9.

Each of the shoe plates 33 and 34 has therein a squared aperture 37 which receives the squared portion of a bearing member 38. The bearing member 38, shown in Figure 8, is comprised of three portions, a small cylindrical portion 38*a* at one face, a substantially larger cylindrical portion 38*b* at the opposite face, and an intermediate squared portion 38*c*. The bearings 38 are inserted into the shoe plates 33 and 34 from the inside so that the squared portion 38*c* rests in the aperture 37. The larger portion 38*b* of the bearing 38 rides against the shoe 33 or 34 and prevents the bearing 38 from passing through the aperture 37. Each of the bearings 38 has a central aperture 39 therein which receives a hub portion 40 of a sprocket 41. The sprocket 41 is thus rotatably mounted between the shoes 33 and 34. A squared aperture 41*a* in the sprocket 41 receives the rotary rod 27.

Figure 3:
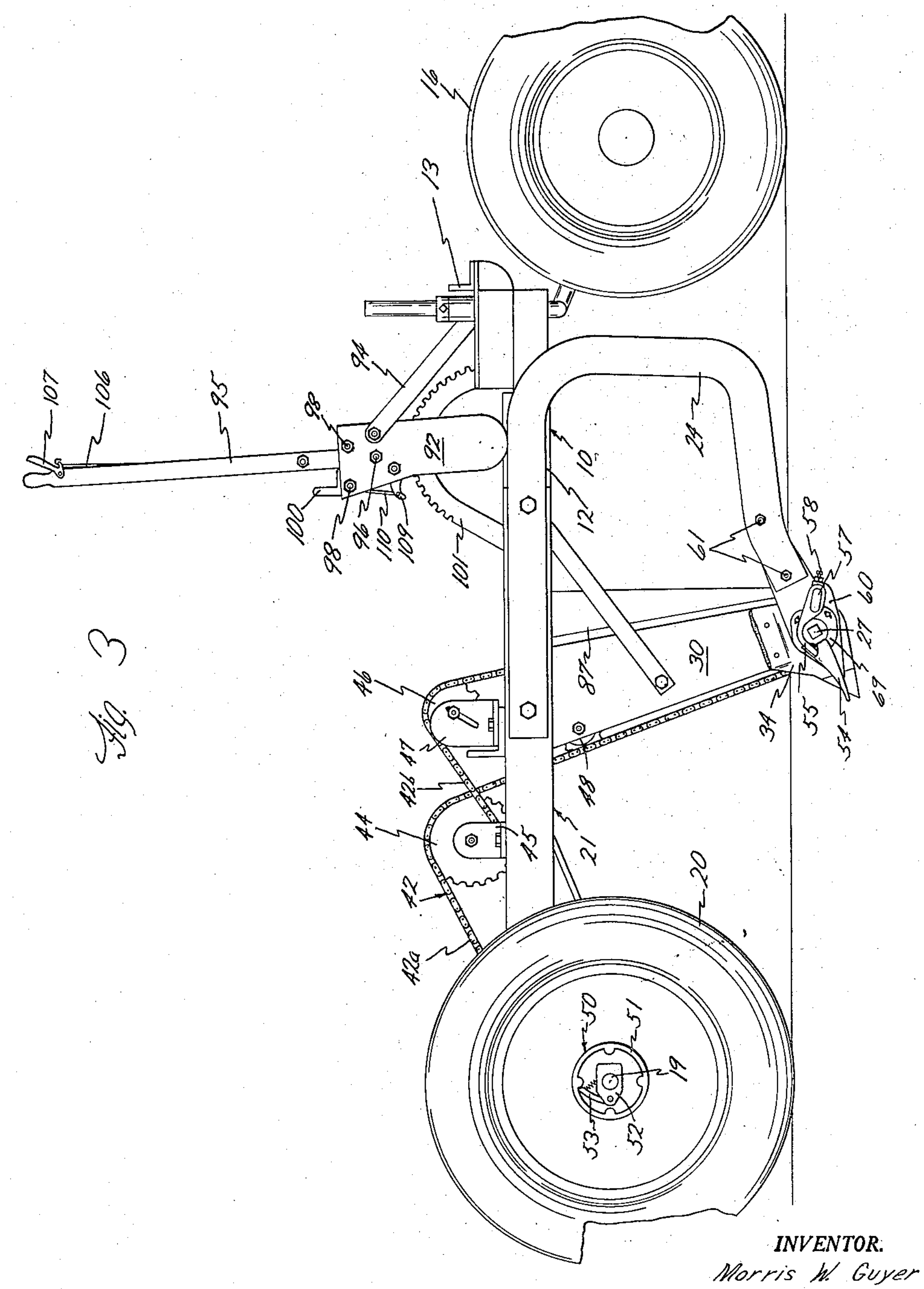
Figure 3 is an enlarged side elevational view of the implement.
Figure 4:
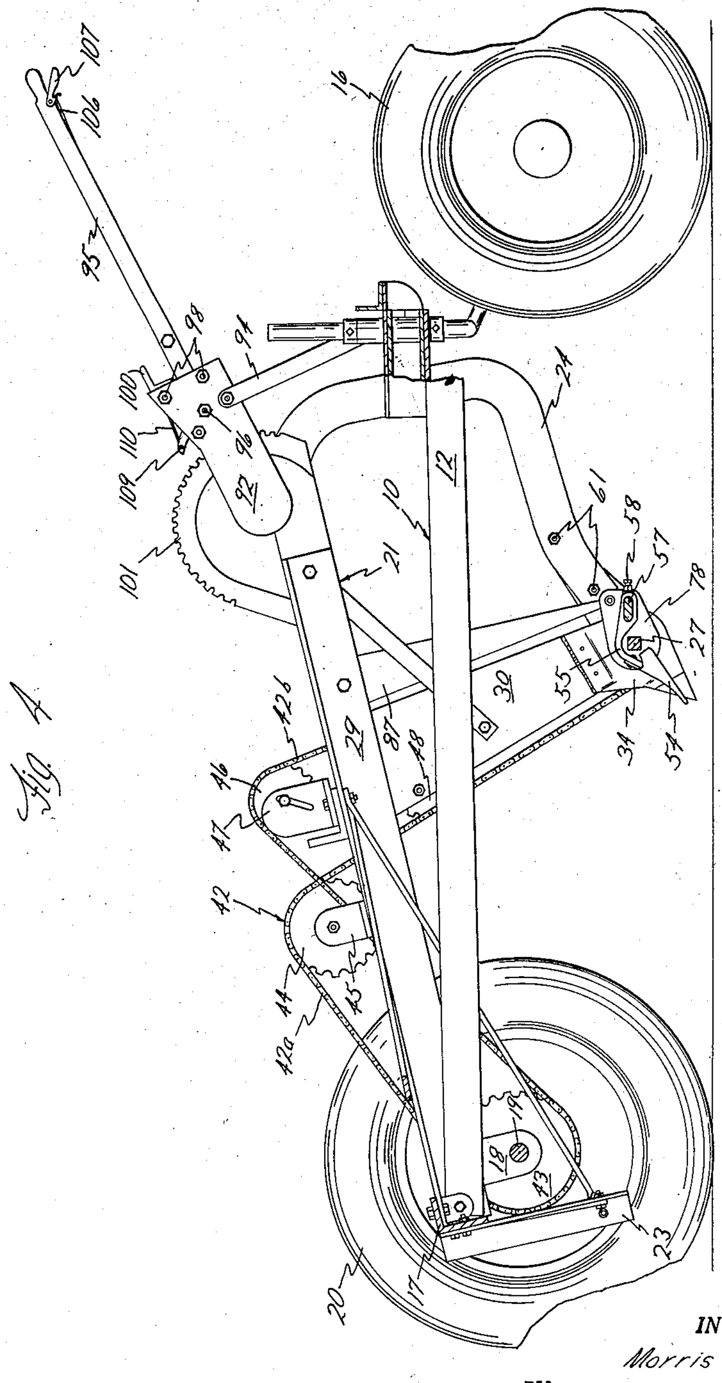
Figure 4 is an enlarged vertical sectional view of the implement taken substantially on the line 4—4 of Figure 1 except illustrating the tillage apparatus raised for transportation.
Figure 5:
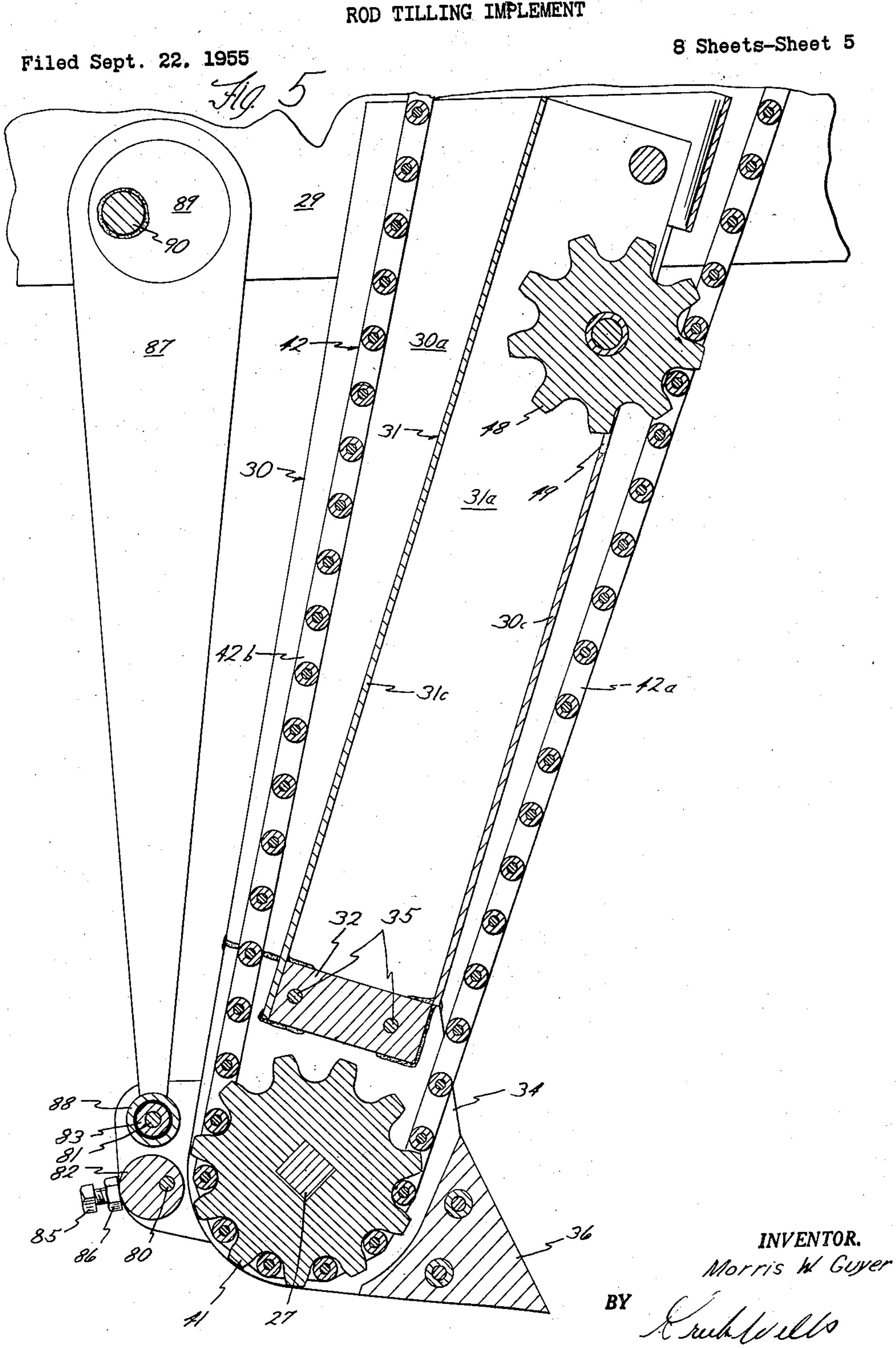
Figure 5 is an enlarged fragmentary sectional view of the drive mechanism for the rotary rod taken substantially on the line 5—5 of Figure 1.

In order to transmit rotational power to the sprocket 41 for rotating the rod 27, a chain 42 is provided. As shown in Figures 3 and 4, the chain 42 is wrapped in the form of a figure eight. Fixed on the axle 19 below the frame members 28 and 29 is a drive sprocket 43 which receives and drives the chain 42. The upper flight 42*a* of the chain extends from the sprocket 43 over an idler sprocket 44 mounted on brackets 45 secured to the members 28 and 29. From the sprocket 44, the flight 42*a* extends down between the members 28 and 29 and in front of the boot 30. The flight 42*a* passes between the shoe plates 33 and 34 and around the sprocket 41. The lower flight 42*b* of the chain 42 extends from the drive sprocket 43 rearwardly and upwardly over a second idler sprocket 46 mounted on a bracket 47 secured to the frame 21 behind the brackets 45. From the idler 46, the flight 42*b* extends down between the walls 30*a* and 30*b* of the boot 30 and engages the sprocket 41. When the implement is drawn forward, the wheels 20 rotate the axle 19 and drive sprocket 43. The chain is driven in the direction indicated in Figure 3 so that it moves upwardly in front of the boot 30. Since the two flights of chain 42*a* and 42*b* must cross in order to drive the rod 27 in a direction opposite to the direction of travel, the idler sprockets 44 and 46 are laterally offset one from the other, as shown in Figure 1. The idler sprocket 46 is mounted on the bracket 47 for vertical adjustment in order to take up excess slack in the chain 42.

The center drive mechanism just described operates efficiently to drive the rod as the implement is drawn through the field. The upwardly moving front flight 42*a* of the chain 42 is positioned in front of the boot 30 so as to elevate and dispose of trash which accumulates on the boot. In order to assist in this operation, a tightening sprocket 48, mounted between the walls 30*a* and 30*b* of the boot 30 and partially exposed through an aperture 49 in the front wall 30*c* of the boot, engages the flight 42*a* and keeps it taut. The particular figure eight formation of the chain 42 permits the direction reversal between the axle 19 and rod 27 with a minimum number of idler sprockets and with a maximum length of chain-to-sprocket driving engagement, thus producing an extremely economical and efficient drive mechanism. The construction of the boot 30 and shoe plates 33 and 34 produces a sturdy but narrow drive support which supports the drive mechanism properly with almost no undesirable soil disturbance or furrowing.

Since the implement is of considerable width, and since it is desirable to make sharp turns possible, clutches 50 are provided between each of the wheels 20 and the axle 19. The wheels 20 are rotatably mounted on the shaft 19 and drivingly connected thereto by the clutches 50. Each of the clutches 50 comprises a ring gear 51 fixed on the wheel 20 and a ratchet hub 52 fixed to the axle 19. A spring pressed pawl 53 is pivoted to the hub 52 and engages the gear 51. As may be seen in Figure 3, the pawl is so positioned that the wheel 20 cannot rotate forwardly on the axle 19, but may rotate in reverse. When the implement is turned, the wheel 20 on the inside of the turn must slow down with respect to the other. Since the pawl is so positioned that forward rotation of the wheel 20 must rotate the axle 19, the wheel 20 at the outside of the turn rotates on the axle 19 in reverse, and the pawl 53 clicks over the teeth of the gears 51. When the slowed down wheels 20 regains its speed, the reverse rotation stops and the pawl engages one of the teeth on the gear 51, causing both the wheels 20 to share the load of driving the rod 27. Since the axle 19 is always driven at the speed of the fastest rotating wheel 20, the rod 27 does not slow down on turns.

Figure 2:
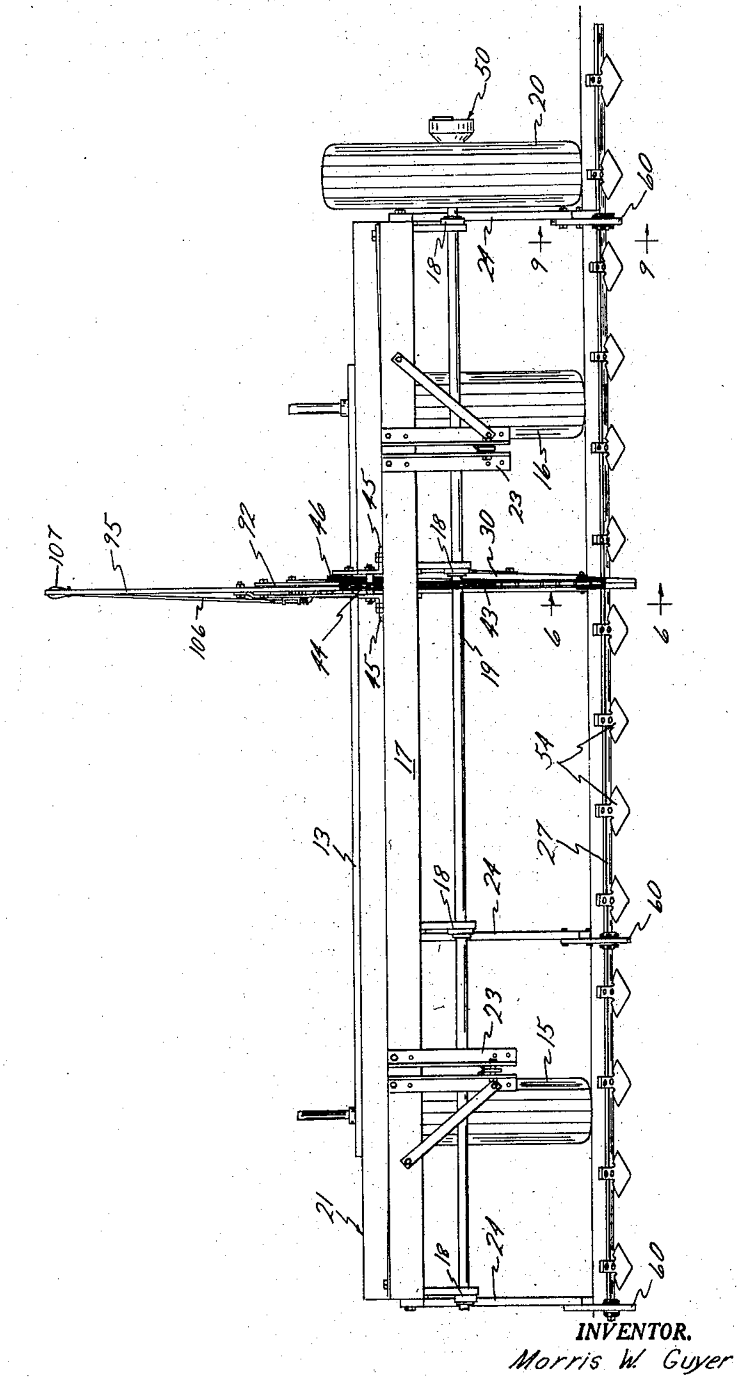
Figure 2 is a front elevational view of the implement.

To assist the rotary rod 27 in cultivating the soil, and to keep the cultivation at a uniform depth, a series of tillage shovels 54 are provided as shown best in Figures 1 and 2. The shovels 54 are mounted on shovel arms 55 which extend rearwardly over the rod 27. The arms 55 have slots 56 near their rear ends which receive transverse bars 57. Set screws 58 lock the arms 55 on the bars 57. There are two of the bars 57, one extending outwardly from each side of the boot 30 behind the rod 27. The bars 57 are supported both by the shoes 25 secured to the goosenecks 24, and by the center drive boot 30.

Now in order to provide for efficient cultivation under varying conditions, the shovels 54 must be angularly adjustable with respect to the ground. This adjustment must not hamper the operation of the rod, so the relationship between the rod and the shovels must remain fixed. This may only be accomplished by making the shovels adjustable about the rod as a center. In order to provide such adjustable supports for the transverse bars 57, each of the shoes 25 is provided with a novel bar supporting construction. This construction provides a bearing for the rod holding spools 26, angularly adjustable supporting means for the bars 57, and also provides for quick and easy access to the bearing means for replacement purposes.

Each of the shoes 25 (best shown in Figures 9, 10, 11 and 12) is made of a plate 59 formed with a pointed tip 60 for cutting through the soil. The plate 59 is secured to the gooseneck 24 by bolts 61. In the plate 59 is an aperture 62 shaped somewhat like a keyhole. The aperture 62 has a front portion 63 which is roughly circular in shape, and receives the spool 26 and rod 27, and a rear portion 64 adapted to receive the transverse bar 57. As may be seen in Figure 11, the rear portion 64 is shaped to permit limited angular adjustment of the bar 57 about the rod 27.

Figure 11:
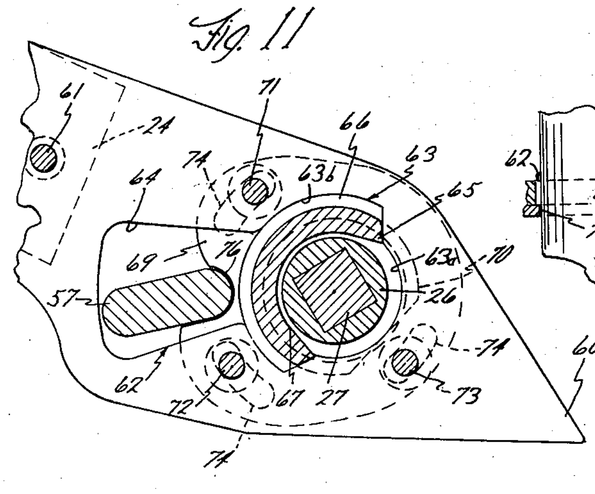
Figure 11 is a fragmentary sectional view taken on the line 11—11 of Figure 10.
Figure 12:
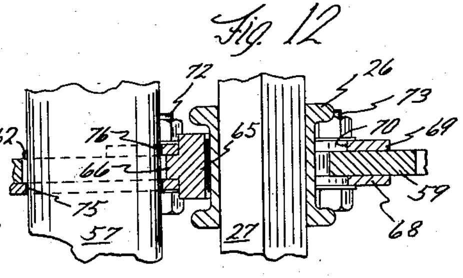
Figure 12 is a fragmentary sectional view taken on the line 12—12 of Figure 9.

The front circular portion 63 of the keyhole aperture 62 is comprised of two semicircular halves, a front half 63*a* of a radius slightly smaller than the radius of the end flanges of the spool 26, and a rear half 63*b* of a radius considerably larger than the radius of the end flanges of the spool 26. A semicircular bearing member 65 having a raised annular rib 66 thereon fits into the circular portion 63 of the aperture 62. The radius of the rib 66 is substantially equal to that of the rear half 63b of the portion 63 and is received thereby. The rib 66 is equal in thickness to the plate 59. The remainder of the bearing member 65, however, is considerably wider and extends outwardly on each side. The bearing member 65 has an inner bearing surface 67 which is substantially equal in radius to the body of the spool 26. When the bearing 65 is in place as shown in Figures 11 and 12, the spool 26 is loosely held in the aperture formed by the front half 63a of the circular aperture 63 and the inner bearing surface 67 of the member 65. The end flanges of the spool 26 are larger than this aperture so the spool 26 is secured against endwise movement.

In order to support the bar 57 at a fixed point in the rear aperture portion 64, a pair of bar supporting plates 68 and 69 are provided. The plates 68 and 69 have circular apertures 70 therein of radius equal to that of the outwardly extending portions of the bearing 65. The plates 68 and 69 are positioned at each side of the shoe plate 59 so that the apertures 70 receive the bearing 65. With this construction, the plates are pivoted on the bearing 65 about the rod 27 as a center. To provide for securing the plates 68 and 69 on each side of the shoe plate 59, three bolts 71, 72 and 73 are provided. The bolts 71, 72 and 73 extend through holes formed in the shoe plate 59, and through slots 74 formed in the plates 68 and 69. The slots 74 are curved about the rod as a center, so that when the bolts 71, 72 and 73 are loosened, the plates 68 and 69 are free to pivot on the bearing 65. The bolts 71, 72 and 73 may be tightened to secure the plates 68 and 69 in place. These plates 68 and 69 also operate to secure the bearing 65 in place, since the rib 66 on the bearing 65 is larger in diameter than the aperture 70. At the rear of the plate 68, a slot 75 is formed. The slot 75 receives and supports the bar 57. The other plate 69, instead of having a similar slot therein, has no elongated rear portion, but instead is formed so as to have a notch 76 at its shortened rear edge which is aligned with the front of the slot 75. The bar 57 is received and supported in this notch 76. With this construction, any dirt which collects in the rear portion 64 of the keyhole aperture 62 may pass out behind the rear edge of the plate 69 rather than be trapped and packed so as to hinder adjustment of the bar 57.

With the novel bar and rod supporting shoe 25 just described, angular adjustment of the bar 57 may be easily accomplished. All that must be done is to loosen the the bolts 71, 72 and 73 and then move the bar as desired within the limits of the slots 70 and the portion 64 of the keyhole aperture 62. Merely tightening up the bolts 71, 72 and 73 secures the bar in the desired position. Since the majority of the wear in the shoe occurs between the rotating spool 26 and the bearing 65, both of which are easily replaceable at small cost, the life of the shoe is extremely great. As may be seen in Figure 10, the shoe is very narrow so the soil disturbance caused by drawing it through the ground is slight.

As stated hereinbefore, the transverse bars 57 are supported both by the shoes 25 and by the center drive boot 30. It is at the boot 30 that the bars 57 are secured against endwise movement and also at the boot 30 that the angular adjustment means are provided. Positioned adjacent the outside faces of the shoe plates 33 and 34 are two bar mounting ears 77 and 78. As may be seen in Figures 6, 7 and 8, the small cylindrical portions 38a of the bearings 38 protrude a short distance from the shoe plates 33 and 34. The ears 77 and 78 have apertures 79 therein which receive the protruding portions 38a so as to mount the ears 77 and 78 for rotation about the rod 27. The ears 77 and 78 extend rearwardly beyond the rear edge of the boot 30, and are tied together by a pair of bolts 80 and 81. The bolts 80 and 81 extend through countersunk holes in the ear 77 and thread into spacers 82 and 83 welded to the other ear 78. The bolts 80 and 81 hold the ears 77 and 78 against the shoe plates 33 and 34 and prevent their slipping outwardly therefrom and off the bearings 38.

Figure 6:
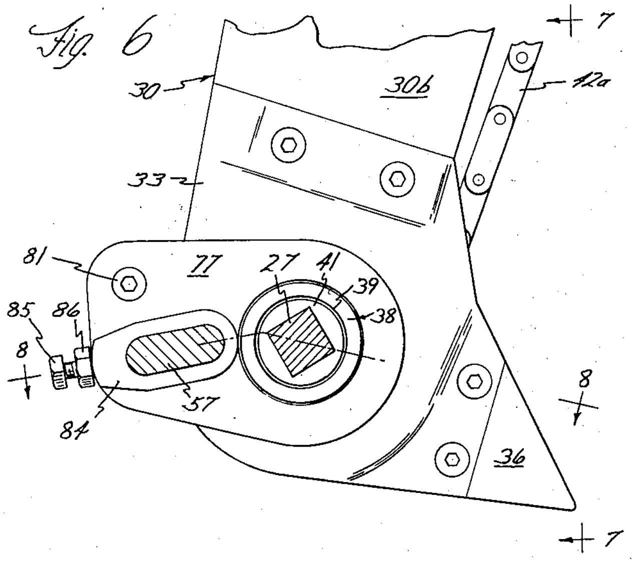
Figure 6 is an enlarged fragmentary sectional view taken on the line 6—6 of Figure 2.
Figure 7:
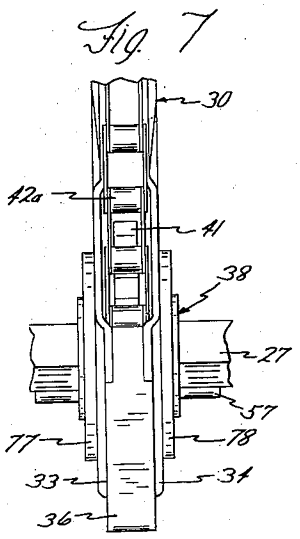
Figure 7 is a fragmentary elevational view of the construction shown in Figure 6 looking in the direction of the arrows 7—7 of Figure 6.

Each of the ears 77 and 78 has a socket 84 welded thereto as shown in Figures 6 and 8. The socket 84 is adapted to receive the end of one of the transverse bars 57. To secure the bar 57 in place, each socket 84 is provided with a set screw 85 and a lock nut 86.

With the transverse shovel carrying bar 57 supported as described both by the shoes 25 and by the ears 77 and 78, it is capable of limited pivotal adjustment about the rod 27. In order to provide an easy means to adjust the bar 57, an arm 87 is provided which extends from the ears 77 and 78 up to the angle irons 28 and 29. The arm 87 has a sleeve 88 at its lower end which fits over the spacer 83 between the ears 77 and 78. At its upper end, the arm 87 is connected to an eccentric portion 89 of a shaft 90. The shaft 90 is supported between the members 28 and 29. A nut 91 fixed on the shaft 90 provides means for rotating the eccentric 89, which lifts or lowers the arm 87 and consequently pivots the ears 77 and 78 and the bars 57. It should be understood that before the ears 77 and 78 can be pivoted to adjust the bars 57, the bolts 71, 72 and 73 on each of the shoes 25 must be loosened to permit the bars 57 to pivot.

The novel rotary rod and shovel supporting mechanism hereinbefore described provides an efficient and economical means by which the rod 27 is mounted for transverse rotation in the soil, and the tillage shovels 54 are mounted for limited angular adjustment about the rod 27 as a center. It should be noted that with the construction described, the shovels 54 and bars 57 may quickly be removed if desired to enable the implement to operate as a rod weeder alone. All that need be done is to loosen the set screws 58 on each of the shovel arms 55 and also the set screws 85 on the sockets 84 which receive the ends of the bar 57. After this has been accomplished, the bars may be pulled outwardly from each side of the implement, sliding through the shoes 25, shedding the shovels 54 as they go.

Since the rod 27 and shovels 54 all operate beneath the ground surface, considerable force is required to pivot the frame 21 upwardly from the frame 10 to lift the rod 27 and shovels 54 clear of the ground. In order to facilitate this operation, the lifting mechanism 22 is provided with a novel construction which permits its use either as a straight lever for lifting or lowering in one motion or as a step-by-step ratchet lever at an increased mechanical advantage.

Figure 13:
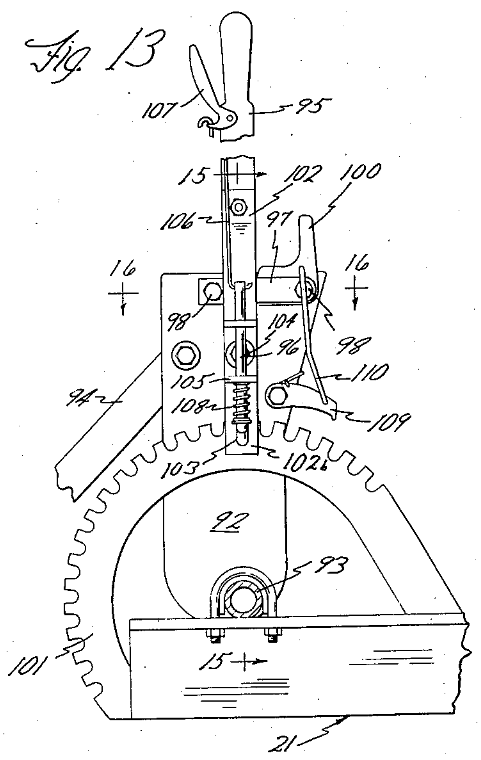
Figure 13 is an enlarged fragmentary sectional view taken on the line 13—13 of Figure 1, illustrating the depth control mechanism.
Figure 15:
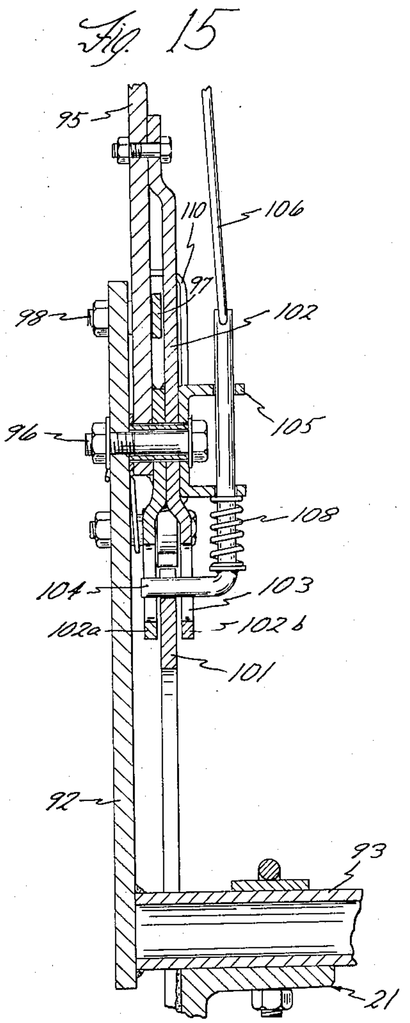
Figure 15 is an enlarged fragmentary sectional view taken on the line 15—15 of Figure 13.
Figure 16:
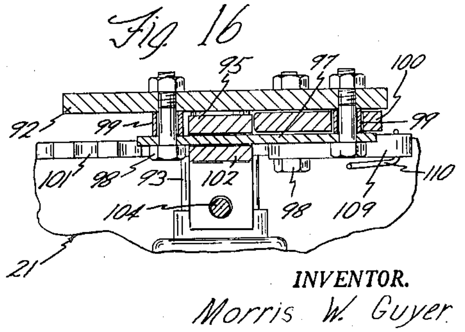
Figure 16 is an enlarged fragmentary sectional view taken on the line 16—16 of Figure 13.

The lifting mechanism 22 comprises a wide lever 92 fixed on the end of a transverse shaft 93. The shaft 93 is rotatably mounted on the frame 21. Near the upper end of the lever 92 a link 94 is pivoted. The opposite end of the link 94 is pivoted to the cross member 13 of the frame 10. To raise the frame 21 with respect to the frame 10, the lever 92 must be pivoted toward the rear of the machine. Now in order to pivot the lever 92 without undue effort, a second, longer lever arm 95 is provided. The lever arm 95 is pivoted to the lever 92 by a bolt 96. At the upper edge of the lever 92, a guide strap 97 is mounted. The strap 97 extends across the top of the lever 92 and is secured thereto by bolts 98. Spacers 99, best shown in Figure 16, hold the strap 97 away from the lever 92. As may be seen in Figures 15 and 16, the lever arm 95 extends up between the lever 92 and strap 97. In ordinary circumstances enough leverage may be obtained to raise or lower the weight of the frame 21 by using the lever arm 95 as an extension of the lever 92. To do this, the lever arm 95 must be non-pivotally fixed to the lever 92. However, with the construction just described, the arm 95 is free to pivot about the bolt 96 within the limits of the spacers 99. In order to prevent this pivoting, a wedge lever 100 is pivotally mounted on one of the spacers 99. When the wedge 100 is in the position shown in Figures 13 and 16, the arm 95 is held solidly, being secured between a spacer 99 and the wedge 100. With the arm 95 so secured, it acts as no more than an extension of the lever 92. To hold the frame 21 at any height above the frame 10, a rack and pin assembly is provided. A rack 101, curved about the shaft 93 as a center, is fixed to the frame 21. A downwardly extending yoke 102 is fixed on the lever arm 95 and receives the track 101 between its separated portions 102*a* and 102*b*. Each of the portions 102*a* and 102*b* has an elongated slot 103 therein through which the horizontal portion of an L-shaped pin 104 extends. The pin 104 extends up in front of the arm 95 and is slidably supported by a bracket 105. A rod 106 is attached to the pin 104 and extends to a pin lifting lever 107 pivoted at the top of the arm 95. As shown in Figure 15, the horizontal portion of the pin 104 engages the rack 101 to hold the lever 92 in the desired position. By squeezing on the pin lifting lever 107, the pin 104 may be lifted clear of the rack 101. A spring 108 forces the pin down again when the lever 107 is released.

Figure 14:
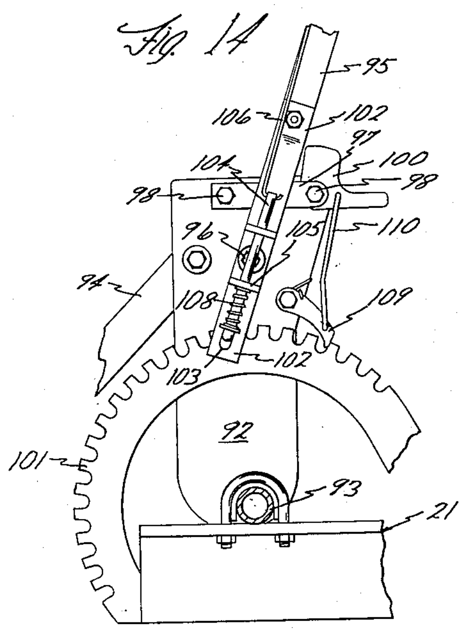
Figure 14 is a view similar to Figure 13 except illustrating the depth control lever adjusted to give the operator an additional mechanical advantage.

When the rod 27 and shovels 54 are embedded in the soil, much more force must be exerted on the lever 92 to raise the frame 21. To exert this additional force without undue strain on the operator of the lever 92, the arm 95 is constructed so that it may be used in a step-by-step fashion at an increased mechanical advantage. To use the arm 95 in this way, the wedge 100 is thrown back out of the way as shown in Figure 14. Then the lever arm 95 is free to pivot between the spacers 99 on the strap 97. The operator grasps the arm 95 and lifts the pin 104 clear of the rack 101. Then he pushes the arm 95 forward as far as it will go. This causes the arm 95 to pivot on the bolt 96 and moves the yoke 102 rearwardly. The operator then releases the pin lifting lever 107 and the pin 104 engages the rack 101 as shown in Figure 14. Now by pulling the arm 95 back, the operator pivots the lever 92 a short distance and raises the frame 21. In order to maintain the lever 92 at this position while the arm 95 is pushed forward for another step, a pawl 109 is provided on the lever 92. The pawl is spring pressed into engagement with the rack 101 to prevent the lever 92 from pivoting forward to lower the frame 21. However, since the pawl is not needed when the arm 95 is secured by the wedge 100 for straight lifting and for lowering, it is connected to the wedge 100 by a rod 110 in such a way that it is lifted out of engagement with the rack 101 when the wedge 100 is moved down to secure the arm 95.

As may readily be seen, use of the arm 95 as a step-by-step lever utilizing the rack 101 as a fulcrum gives an increased mechanical advantage to the lifting mechanism 22. It is evident that the arms 95 must move a greater distance to move the lever 92 a specified amount than when it is secured as an extension of the lever 92. Since the moving distance is greater to lift an equal distance on the frame 21, it follows that the force needed to move the arm 95 is lessened.

It is believed evident from the foregoing description than my improved tillage implement provides for easy, efficient, and economical soil cultivation. The rod 27 and shovels 54 which travel beneath the ground surface are sturdily attached to the implement by supporting means which are designed to operate most effectively and yet cause a minimum of soil disturbance. The shovels are mounted for quick and easy angular adjustment with respect to the ground by mounting means which do not interfere with the operation of the rotary rod. The drive mechanism for the rod is designed for best performance with a minimum of parts, thus saving in manufacturing and repair costs. The lifting mechanism permits the implement to be readily adjusted to the proper cultivation depth and also allows the operator to lift the rod and shovels clear of the ground without effort even under the most adverse conditions.

All of the elements in the device combine to provide a soil cultivating implement of great novelty and usefulness.

Having thus described my invention, I claim:

1. In a tillage implement, a rotary rod supporting frame, spaced apart rod supporting standards depending from said frame, bearing shoes mounted at the lower ends of said standards, a transverse rotary rod rotatably secured in said shoes, a center drive boot having a front wall and spaced apart side walls depending from said frame, a shoe plate fixed at the lower end of one of said side walls of the boot, a second shoe plate positioned at the lower end of the opposite side wall, bolts extending through said second shoe plate and through said boot whereby to secure the plate to the boot, a nose piece bolted between said shoe plates at the front thereof, each of said shoe plates having a squared aperture therein, bearing members having squared portions intermediate their ends which are seated in said apertures, said bearing members having small cylindrical portions thereon extending outwardly from said squared portions, a drive sprocket journalled in said bearing members, said sprocket having a squared aperture therein receiving the transverse rotary rod, a chain drivingly engaged with said sprocket and extending upwardly to the frame, drive means on the frame to drive the chain, bar mounting ears positioned outside of each shoe plate, said ears having apertures therein receiving the small cylindrical portions of said bearing members and being rotatably mounted thereon, said ears extending rearwardly of the shoe plates and being bolted together at their rear ends, means to adjust the ears angularly about the bearing members, bar receiving sockets on said ears, transverse bars secured in said sockets and extending outwardly therefrom, means on the bearing shoes to mount the bars for limited rotation about the rod, and a plurality of tillage shovels positioned in front of the rod and mounted on said transverse bars.

2. In a tillage implement, a soil cultivating device comprising a transverse rotary rod, a drive mechanism for the rod, a series of tillage shovels, a transverse bar supporting said shovels, spaced apart standards for supporting the rod, bearing shoes secured to said standards, said bearing shoes each having a rod receiving aperture therein, a rod supporting bearing member seated in said aperture and extending outwardly at each side of said shoe, bar supporting plates pivoted on said bearing member at each side of the shoe, means on the shoe securing the plates against transverse movement, and at least one of the plates having a slot therein receiving and supporting the transverse bar behind the rod for limited rotation about the rod.

3. In a tillage implement, a soil cultivating device comprising a transverse rotary rod, a drive mechanism for the rod, a series of tillage shovels, a transverse bar carrying said shovels, spaced apart standards for supporting the rod, bearing shoes attached to the lower ends of said standards, each of said shoes having an aperture therein, said aperture having a front portion to receive the rod and a rear portion to receive the transverse bar, said rear portion being shaped to permit angular adjustment of the bar with respect to the rod, a semicircular bearing member having a raised annular rib thereon positioned in the rod receiving portion of said aperture, a bearing spool non-rotatably mounted on the rod and extending through said rod receiving portion of the aperture in front of said semicircular bearing, said semicircular bearing having an inner bearing surface receiving the spool, said semicircular bearing being wider than the shoe and extending outwardly at each side thereof, bar supporting plates positioned at each side of said shoe, said plates having apertures therein receiving said outwardly extending semicircular bearing, a plurality of slots in said plates, said slots being curved about the rod as a center, bolts on said shoe extending through said slots, nuts threaded on said bolts whereby to secure the plates against transverse movement with respect to the shoe, and at least one of said plates having a slot therein to receive the transverse bar and support it behind the rod for angular adjustment about the rod.

4. In a tillage implement, a soil cultivating device comprising a transverse rotary rod, a drive mechanism for the rod, a series of tillage shovels, a transverse bar carrying said shovels, spaced apart standards for supporting the rod, bearing shoes attached to the lower ends of said standards, each of said shoes having a rod receiving aperture therein and having a transverse bar receiving aperture therein shaped to permit limited angular adjustment of the bar about the rod as a center, said rod receiving aperture having a front portion and a rear semicircular portion of larger diameter than said front portion, a semicircular bearing member having a raised annular rib thereon seated in said rear semicircular portion of the rod receiving aperture, said bearing being wider than the shoe and extending outwardly at each side thereof, bar supporting plates positioned at each side of said shoe, said plates having apertures therein receiving said outwardly extending bearing member, a plurality of slots in said plates, said slots being curved about the rod as a center, bolts on said shoe extending through said slots, nuts threaded on the bolts whereby to clamp the plates against the shoe, and one of said plates having a slot therein to receive and support the transverse bar behind the rod for limited angular adjustment about the rod.

5. In a tillage implement comprising a main supporting frame, a rod supporting frame overlying the main frame and pivoted thereto at the front edge thereof for vertical angular adjustment, a series of spaced apart rod supporting standards depending from said rod supporting frame, bearing shoes on said standards, a transverse rotary rod journalled in said shoes, a drive mechanism for the rod, the improvement in means for raising and lowering the rod supporting frame with respect to the main frame comprising a transverse shaft rotatably secured to the rod supporting frame at the rear edge thereof, a lever plate fixed to said shaft, a connecting link pivoted to said plate and pivoted to the main frame whereby to change the angular relation of the rod supporting frame relative to the main frame upon rotation of the lever plate, a gear segment fixed to the rod supporting frame and extending vertically adjacent the lever plate, a lever arm pivoted to the lever plate and having a bifurcated portion at its lower end receiving the gear segment, a latch pin secured on the lever arm for longitudinal movement thereon, said pin having a horizontal gear engaging portion at its lower end, said horizontal portion extending through slots in the bifurcated end of the lever arm and engaging the gear, means on the lever arm to raise said latch pin out of engagement with the gear segment, a guide strap mounted at the upper end of the lever plate, bolts at each end of the strap securing it to the plate, the lever arm extending between the strap and the plate and confined to limited pivotal movement between the bolts, a wedge member pivoted to one of the bolts and operable to swing against the lever arm and wedge it against the opposite bolt whereby to prevent pivotal movement, a pawl pivoted to the plate and operable to engage the gear segment to prevent lowering of the rod supporting frame, and a connecting rod between the pawl and the wedge operable to lift the pawl from engagement with the gear when the wedge is pivoted against the lever arm.

6. In a tillage implement having a main supporting frame and a cultivator supporting frame pivoted to the main frame for vertical angular adjustment, a lifting mechanism connecting the main frame and the cultivator supporting frame at a point remote from the pivot comprising a lever plate pivoted to one of said frames, a connecting link pivoted to the plate and to the other of said frames whereby to alter the angular relation of said frames upon pivoting of the plate, a vertical gear segment mounted on the frame carrying the lever plate adjacent the plate, a lever arm pivoted to the plate, a latch pin mounted on the lever arm for longitudinal movement thereon, said latch pin having a gear segment engaging portion engaging said segment, means on the lever arm to lift the pin out of engagement with the segment, means on the lever plate to secure the arm against pivotal movement with respect to the plate, a pawl pivoted to the plate and engaging the gear segment whereby to prevent movement of the lever plate in one direction, and a connecting rod connecting the pawl to the lever arm securing means operable to lift the pawl out of engagement with the gear segment when the lever arm is secured.

7. In a tillage implement, a rotary rod supporting frame, spaced apart rod supporting standards depending from said frame, bearing shoes mounted at the lower ends of said standards, a transverse rotary rod rotatably secured in said shoe, a center drive boot having a front wall and spaced apart side walls depending from said frame, a shoe plate fixed at the lower end of one of said side walls of the boot, a second shoe plate positioned at the lower end of the opposite side wall, bolts extending through said second shoe plate and through said boot whereby to secure the plate to the boot, a nose piece bolted between said shoe plates at the front thereof, each of said shoe plates having a non-circular aperture therein, bearing members having non-circular portions shaped similar to said apertures intermediate their ends which are seated in said apertures, said bearing members having larger head portions thereon extending inwardly from said non-circular portions which are positioned between the shoe plates whereby to prevent the bearing members from sliding outwardly through said apertures, said bearing members having small cylindrical portions thereon extending outwardly from said squared portions, a drive sprocket journalled in said bearing members, said sprocket having a squared aperture therein receiving the transverse rotary rod, a chain drivingly engaged with said sprocket and extending upwardly to the frame, drive means on the frame to drive the chain, bar mounting ears positioned outside of each shoe plate, said ears having apertures therein receiving the small cylindrical portions of said bearing members and being rotatably mounted thereon, said ears extending rearwardly of the shoe plates and being bolted together at their rear ends, means to adjust the ears angularly about the bearing members, bar receiving sockets on said ears, transverse bars secured in said sockets and extending outwardly therefrom, means on the bearing shoes to mount the bars for limited rotation about the rod, and a plurality of tillage shovels positioned in front of the rod and mounted on said transverse bars.

8. In a tillage implement, the combination with a supporting standard of a transverse rotary rod, a rod bearing slidably but non-rotatably receiving the rod, a tillage point carrying bar, and means for rotatably supporting said rotary rod bearing on the standard and supporting said bar on the standard for limited angular movement about the rod as an axis, said means comprising a bearing shoe fixed on the standard and having an aperture therein receiving the rod bearing, an intermediate bearing member seated in the aperture and having an inner bearing surface receiving the rod bearing for rotation thereagainst, plates positioned at each side of said bearing shoe and against said intermediate bearing member whereby to retain it therebetween, at least one of said plates having means thereon spaced from the center of the rod for supporting said bar, and means for supporting said plates to the shoe for limited angular movement about the rod as an axis.

9. In a tillage implement, a soil cultivating device comprising a transverse rotary rod, a drive mechanism for the rod, a series of tillage points, a transverse bar carrying said tillage points, spaced apart standards for supporting the rod, bearing shoes fixed to said standards, each of said shoes having a rod receiving aperture therein, a bearing member seated in said rod receiving aperture, a rod bearing on the rod, said rod bearing being received in said rod receiving aperture, the first named bearing member having an inner bearing surface receiving said rod bearing for rotation thereagainst, bar supporting plates positioned at each side of said shoe and retaining said first named bearing member therebetween, said plates having apertures therein receiving the rod, a plurality of slots in said plates, said slots being curved about the rod as a center, bolts on said shoe extending through said slots whereby to support the plates on the shoe for limited angular adjustment about the rod as a center, nuts threaded on the bolts to clamp the plate to the shoe, and bar supporting means on at least one of the plates spaced from the rod for supporting the bar for limited angular adjustment about the rod as an axis.

10. In a tillage implement, a soil cultivating device comprising a transverse rotary rod, a drive mechanism for the rod, a series of tillage shovels, a transverse bar carrying said shovels, spaced apart standards for supporting the rod, bearing shoes attached to the lower ends of said standards, each of said shoes having an aperture therein, said aperture having a front portion to receive the rod and a rear portion to receive the transverse bar, said rear portion being shaped to permit angular adjustment of the bar with respect to the rod, a semicircular bearing member having a raised annular rib thereon positioned in the rod receiving portion of said aperture, a bearing spool non-rotatably mounted on the rod and extending through said rod receiving portion of the aperture in front of said semicircular bearing, said semicircular bearing having an inner bearing surface receiving the spool, said semicircular bearing being wider than the shoe and extending outwardly at each side thereof, bar supporting plates positioned at each side of said shoe, said plates having apertures therein receiving said outwardly extending semicircular bearing, means for supporting said plates to the shoe for limited angular movement about the rod as an axis, and means on at least one of said plates for supporting said bar.

11. In a tillage implement, a soil cultivating device comprising a transverse rotary rod, a drive mechanism for the rod, a series of tillage shovels, a transverse bar carrying said shovels, spaced apart standards for supporting the rod, bearing shoes attached to the lower end of said standards, each of said shoes having a rod receiving aperture therein and having a transverse bar receiving aperture therein shaped to permit limited angular adjustment of the bar about the rod as a center, said rod receiving aperture having a front portion and a rear semicircular portion of larger diameter than said front portion, a semicircular bearing member having a raised annular rib thereon seated in said rear semicircular portion of the rod receiving aperture, said bearing being wider than the shoe and extending outwardly at each side thereof, bar supporting plates positioned at each side of said shoe, said plates having apertures therein receiving said outwardly extending bearing member, means for supporting said plates to the shoe for limited pivotal movement on said outwardly extending bearing member about the rod as an axis, and means on at least one of said plates for supporting said bar.

12. In a tillage implement of the character described, a center drive boot, a first shoe plate fixed on said boot, a second shoe plate separably connected to said boot and spaced transversely from said first shoe plate, a drive sprocket positioned between said shoe plates, hub portions at each side of said sprocket, said sprocket and said hub portions having rod receiving apertures therein, a weeding rod extending through said apertures, bearing members having inner bearing surfaces therein receiving and rotatably supporting said hub portions, said bearing members having polygonal portions thereon, said first and second shoe plates having polygonal apertures therein non-rotatably receiving said bearing members whereby to mount said bearing members in the shoe plates, and said bearing members having enlarged portions thereon adjacent the polygonal portions and positioned between the shoe plates whereby to prevent the bearing members from moving outwardly.

13. In a tillage implement of the character described, a center drive boot, a first shoe plate fixed on said boot, a second shoe plate separably connected to said boot and spaced transversely from said first shoe plate, a drive sprocket positioned between said shoe plates, hub portions at each side of said sprocket, said sprocket and said hub portions having rod receiving apertures therein, a weeding rod extending through said apertures, bearing members having inner bearing surfaces therein receiving and rotatably supporting said hub portions, said first and second shoe plates having apertures therein receiving said bearing members whereby to mount said bearing members in the shoe plates, and said bearing members having enlarged portions thereon positioned between the shoe plates whereby to prevent the bearing members from moving outwardly.

14. In a tillage implement having a rod supporting frame, spaced apart rod supporting standards depending from said frame, and a transverse rotary rod rotatably supported at the lower ends of said standards, the improvement in center drive means for the rod comprising a center drive boot depending from said frame, a first shoe plate fixed on said boot, a second shoe plate separably connected to said boot and spaced transversely from said first shoe plate, each of said shoe plates having a polygonal aperture therein, bearing members having inner bearing surfaces and having polygonal portions thereon non-rotatably received in said polygonal apertures in said shoe plates whereby to mount said bearing members in the shoe plates, said bearing members having enlarged portions adjacent said polygonal portions and positioned between said shoe plates whereby to prevent said bearing members from moving transversely out of said shoe plates, a sprocket between said shoe plates, said sprocket having hub portions thereon rotatably received in the bearing members whereby to mount said sprocket between the shoe plates, said sprocket being non-rotatably mounted on the rod, and drive means on the rod carrying frame for driving the sprocket.

15. In a tillage implement, a rotary rod supporting frame, spaced apart rod supporting standards depending from said frame, bearing shoes mounted at the lower ends of said standards, a transverse rotary rod rotatably secured in said shoes, a center drive boot depending from said frame, a first shoe plate fixed to said boot, a second shoe plate separably connected to the boot and transversely spaced from said first shoe plate, each of said shoe plates having an aperture therein, bearing members seated in said apertures, said bearing members having enlarged portions thereon positioned between said plates whereby to prevent the bearing members from moving transversely outwardly from the shoe plates, said bearing members having cylindrical portions extending outwardly from the shoe plates, a drive sprocket journalled in said bearing members between the shoe plates, said sprocket having an aperture therein non-rotatably receiving the rotary rod, drive means on the frame drivingly connected to the sprocket, bar mounting ears positioned outside of each shoe plate, said ears having apertures therein receiving the outwardly extending cylindrical portions of said bearing members and being rotatably mounted thereon, said ears extending rearwardly of the shoe plates and being connected together near their rear ends, means to adjust the ears angularly about the bearing members, bar mounting means on the ears, transverse bar means secured to said last named means and extending outwardly therefrom, means on the bearing shoes to mount the bar means for limited rotation about the rotary rod, and a plurality of tillage shovels mounted on said transverse bar means.

References Cited in the file of this patent

UNITED STATES PATENTS

| | | |
|---|---|---|
| 1,718,503 | Van Patten | June 25, 1929 |
| 2,282,560 | Calkins et al. | May 12, 1942 |
| 2,318,097 | Richmond | May 4, 1943 |
| 2,506,577 | Calkins | May 9, 1950 |
| 2,601,653 | Wolfe | June 24, 1952 |
| 2,784,655 | Guyer | Mar. 17, 1957 |